(12) United States Patent
Wang et al.

(10) Patent No.: US 9,738,741 B2
(45) Date of Patent: Aug. 22, 2017

(54) AMPHIPHILIC MACROMOLECULE AND USE THEREOF

(75) Inventors: Jinben Wang, Beijing (CN); Xiaohui Xu, Beijing (CN); Xuefeng Shi, Beijing (CN); Yuchun Han, Beijing (CN); Yilin Wang, Beijing (CN); Haike Yan, Beijing (CN)

(73) Assignee: BEIJING JUNLUN RUNZHONG SCIENCE & TECHNOLOGY CO., LIMITED (CN)

( * ) Notice: Subject to any disclaimer, the term of this patent is extended or adjusted under 35 U.S.C. 154(b) by 837 days.

(21) Appl. No.: 14/235,016

(22) PCT Filed: Sep. 16, 2011

(86) PCT No.: PCT/CN2011/001576
§ 371 (c)(1),
(2), (4) Date: May 9, 2014

(87) PCT Pub. No.: WO2013/013354
PCT Pub. Date: Jan. 31, 2013

(65) Prior Publication Data
US 2014/0316092 A1    Oct. 23, 2014

(30) Foreign Application Priority Data

Jul. 26, 2011 (CN) .......... 2011 1 0210319

(51) Int. Cl.
| | | |
|---|---|---|
| C08F 226/02 | (2006.01) | |
| C08F 220/36 | (2006.01) | |
| C08F 220/34 | (2006.01) | |
| C08F 220/06 | (2006.01) | |
| C08F 220/56 | (2006.01) | |
| C08F 232/04 | (2006.01) | |
| C09K 8/584 | (2006.01) | |
| C09K 8/60 | (2006.01) | |
| C09K 8/68 | (2006.01) | |
| C09K 8/88 | (2006.01) | |
| C04B 24/16 | (2006.01) | |
| C09K 8/467 | (2006.01) | |
| C09K 8/035 | (2006.01) | |
| C08F 12/28 | (2006.01) | |
| C08F 12/30 | (2006.01) | |
| C08F 12/12 | (2006.01) | |
| C04B 24/26 | (2006.01) | |
| C08F 12/08 | (2006.01) | |
| C08F 212/08 | (2006.01) | |
| C08F 212/12 | (2006.01) | |
| C08F 212/14 | (2006.01) | |
| C04B 103/46 | (2006.01) | |

(52) U.S. Cl.
CPC .......... *C08F 226/02* (2013.01); *C04B 24/163* (2013.01); *C04B 24/2652* (2013.01); *C04B 24/2688* (2013.01); *C08F 12/28* (2013.01); *C08F 12/30* (2013.01); *C08F 220/06* (2013.01); *C08F 220/34* (2013.01); *C08F 220/36* (2013.01); *C08F 220/56* (2013.01); *C08F 232/04* (2013.01); *C09K 8/035* (2013.01); *C09K 8/467* (2013.01); *C09K 8/584* (2013.01); *C09K 8/604* (2013.01); *C09K 8/608* (2013.01); *C09K 8/68* (2013.01); *C09K 8/882* (2013.01); *C04B 24/267* (2013.01); *C04B 24/2694* (2013.01); *C04B 2103/46* (2013.01); *C08F 12/08* (2013.01); *C08F 12/12* (2013.01); *C08F 212/08* (2013.01); *C08F 212/12* (2013.01); *C08F 212/14* (2013.01); *C08F 2220/346* (2013.01); *C08F 2220/365* (2013.01)

(58) Field of Classification Search
CPC ...... C08F 220/34; C08F 220/36; C08F 12/12; C08F 12/08; C08F 212/08; C08F 212/12; C08F 2220/346; C08F 2220/365; C08F 226/02; C04B 24/267; C04B 24/163; C04B 24/2688; C04B 24/2694
See application file for complete search history.

(56) References Cited

U.S. PATENT DOCUMENTS

| | | |
|---|---|---|
| 4,653,584 A | 3/1987 | Ball et al. |
| 4,702,319 A | 10/1987 | Bock et al. |

FOREIGN PATENT DOCUMENTS

| | | | |
|---|---|---|---|
| CN | 101492515 A | | 7/2009 |
| CN | 101781386 A | | 7/2010 |
| CN | 101798503 A | | 8/2010 |
| JP | 09279500 A | * | 10/1997 |
| WO | 2013013356 A1 | | 1/2013 |

OTHER PUBLICATIONS

English Abstract of Chinese Publication No. CN101492515, published Jul. 29, 2009; downloaded Jan. 22, 2014.
(Continued)

*Primary Examiner* — Ling Choi
*Assistant Examiner* — David L Miller
(74) *Attorney, Agent, or Firm* — Polsinelli PC

(57) ABSTRACT

Amphiphilic macromolecules having repeating structural units: structural units to adjust molecular weight and molecular weight distribution and charging property effects, high stereo-hindrance structural units, and amphiphilic structural units, which are suitable for fields such as oil field well drilling, well cementation, fracturing, oil gathering and transfer, sewage treatment, sludge treatment and papermaking, etc., and can be used as an oil-displacing agent for enhanced oil production, a heavy oil viscosity reducer, a fracturing fluid, a clay stabilizing agent, a sewage treatment agent, a papermaking retention and drainage aid or a reinforcing agent, etc.

13 Claims, 1 Drawing Sheet

(56) References Cited

OTHER PUBLICATIONS

English Abstract of Chinese Publication No. CN101781386, published Jul. 21, 2010; downloaded Jan. 22, 2014.
English Abstract of Chinese Publication No. CN101798503, published Aug. 11, 2010; downloaded Jan. 22, 2014.
English Abstract of International Publication No. WO 2013/013354, published Jan. 31, 2013; downloaded Jan. 22, 2013.
Chinese International Search Report for International Application No. PCT/CN2011/001576 dated Apr. 19, 2012.
English translation of International Search Report for International Application No. PCT/CN2011/001576 dated Apr. 19, 2012.

\* cited by examiner

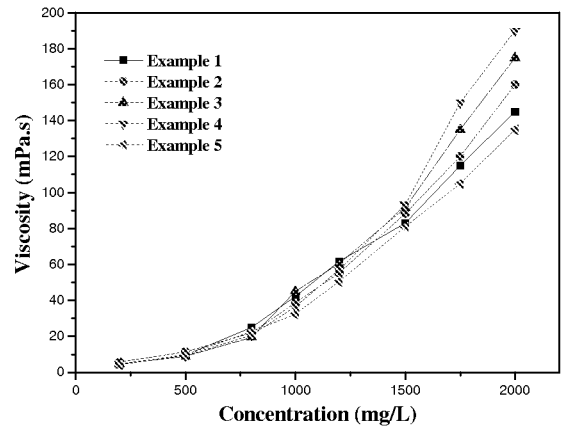
Figure 1: The relationship between the viscosity and concentration
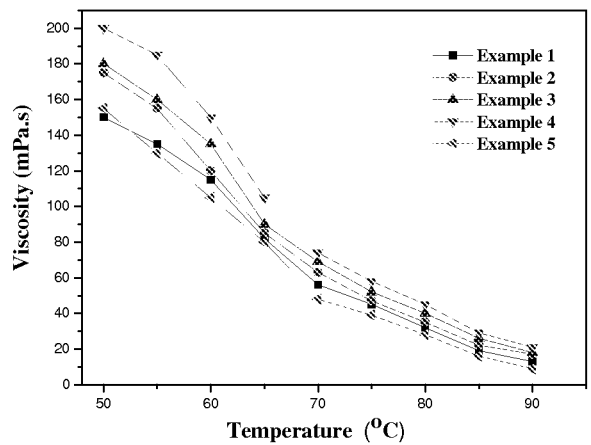
Figure 2: The relationship between the viscosity and temperature

AMPHIPHILIC MACROMOLECULE AND USE THEREOF

CROSS-REFERENCE TO RELATED APPLICATIONS

This application is a national stage entry of PCT/CN2011/001576 filed Sep. 16, 2011, which claims priority to Chinese Patent Application No. 201110210319.3, filed on Jul. 26, 2011, said applications are expressly incorporated herein in their entirety.

TECHNICAL FIELD

This invention relates to an amphiphilic macromolecule and uses thereof, and this amphiphilic macromolecule is applicable to oilfield drilling, well cementing, fracturing, crude oil gathering and transporting, sewage treating, sludge treating and papermaking, and it can be used as intensified oil producing agent and oil displacing agent, heavy oil viscosity reducer, fracturing fluid, clay stabilizer, sewage treating agent, retention aid and drainage aid and strengthening agent for papermaking.

BACKGROUND OF INVENTION

The solution viscosity and viscosity stability of the polymer used for tertiary oil recovery are important indicators to determine its using effect. Reservoir temperature, mineralization degree of formation water and injection water affect the viscosifying capacity of the polymer solution directly. For partially hydrolyzed polyacrylamide, although it has obvious viscosifying action in fresh water, the hydrodynamic radius of polymer macromolecules decreases with the increase of reservoir temperature, mineralization degree of formation water and injection water, in the meantime, the increase of the adsorption amount of this polymer on the surface of rocks also decreases the valid concentration of the solution, resulting in a decline of the solution viscosity. Amphiphilic macromolecules are an important class of water-soluble polymers; by introducing a small amount of hydrophobic groups on the hydrophilic macromolecular chains, an intramolecular or intermolecular hydrophobic interaction is generated, rendering the macromolecules to form a steric network structure, and thus has a remarkable viscosifying effect. By increasing the hydrophobic group content on the macromolecule chain or increasing the molecular weight, the impacts of high temperature and high salinity can be resisted to some extent; however, it may also result in deterioration of dissolving capacity of the polymer, substantial increase of dissolving time, easy shear degradation of the macromolecular chain and easy adsorption on the rock and other problems. Furthermore, with the increase of formation temperature and water mineralization degree, these problems are particularly serious.

Heavy oil resource has become one of the important natural resources for strategic replacement, but it's difficult to exploit. The main reason is that the heavy oil is high in viscosity, high in gum, asphaltenes contents or wax content, and does not easily flow in formation, wellbore and pipeline. Additionally, because of the great oil-water mobility ratio, it will also cause fast water breakthrough, high water content, and easy formation sand production and other serious problems negatively affecting the oil production.

Nowadays, to keep the viscosifying properties and viscosity stability of the polymer solution, and to improve its ability for heavy oil emulsification, dispersion and viscosity-reduction have great significance on the enhancement of crude oil recovery and the maximizing of tapping of the potential underground residual crude oil.

BRIEF DESCRIPTION OF THE INVENTION

In the following context of this invention, unless otherwise defined, the same variable group, and molecular and structural formula have the same definitions.

The instant invention relates to an amphiphilic macromolecule. This amphiphilic macromolecule has repeating units as described below: a structural unit A for adjusting molecular weight, molecular weight distribution and charge characteristics, a highly sterically hindered structural unit B and an amphiphilic structural unit C.

In an embodiment, the structural unit A for adjusting molecular weight, molecular weight distribution and charge characteristics comprises (meth)acrylamide monomer unit $A_1$ and/or (meth)acrylic monomer unit $A_2$. Preferably, the structural unit A includes (meth)acrylamide monomer unit $A_1$ and/or (meth)acrylic monomer unit $A_2$ simultaneously. In the art, the molecular weight of the amphiphilic macromolecule may be selected as needed, preferably, this molecular weight may be selected between 1000000-20000000.

Preferably, the (meth)acrylamide monomer unit $A_1$ has a structure of formula (1):

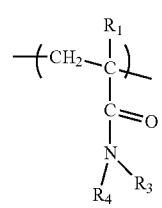

formula (1)

In formula (1), $R_1$ is H or a methyl group; $R_2$ and $R_3$ are independently selected from the group consisting of H and a $C_1$-$C_3$ alkyl group; $R_2$ and $R_3$ are preferably H. Preferably, the (meth)acrylic monomer unit $A_2$ is (meth)acrylic acid and/or (meth)acrylate. Preferably the (meth)acrylate is sodium methacrylate.

Preferably, based on 100 mol % of the entire amphiphilic macromolecule repeating units, the molar percentage of (meth)acrylamide monomer unit $A_1$ is 70-99 mol %; preferably 70-90 mol %, more preferably 70-78 mol %.

Preferably, the molar percentage of (meth)acrylic acid monomer unit $A_2$ in the whole amphiphilic polymer repeat unit is 1-30 mol %; preferably 1-28 mol %, and more preferably 20-28 mol %.

In another embodiment, the structural unit A for the regulation of molecular weight, molecular weight distribution and charge characteristics has a structure of formula (2):

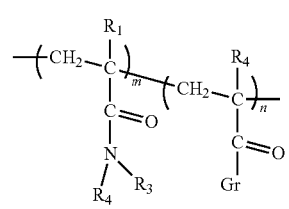

formula (2)

wherein, $R_1$ is H or a methyl group; $R_2$ and $R_3$ are independently selected from the group consisting of H and a $C_1$-$C_3$ alkyl group; $R_2$ and $R_3$ are preferably H; $R_4$ is selected from H or a methyl group; Gr is —OH or —O⁻Na⁺; m and n represent the molar percentages of the structural units in the entire amphiphilic macromolecule repeating unit, and m is 70-99 mol %, preferably 70-90 mol %, more preferably 70-78 mol %; n is 1-30 mol %, preferably 1-28 mol %, more preferably 20-28 mol %.

In another embodiment, in formula (2), $R_1$-$R_3$ are preferably H, and Gr is preferably —O$^-$Na$^+$.

In another embodiment, the highly sterically hindered structural unit B contains at least a structure G, wherein the structure G is a cyclic hydrocarbon structure formed on the basis of two adjacent carbon atoms in the main chain, or is selected from a structure of formula (3), and the highly sterically hindered structural unit B optionally contains a structure of formula (4):

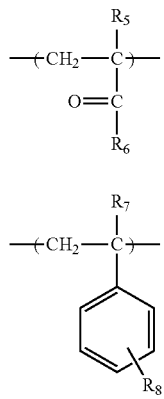

formula (3)

formula (4)

In formula (3), $R_5$ is H or a methyl group; preferably H; $R_6$ is a radical selected from the group consisting of the structures of formulas (5) and (6).

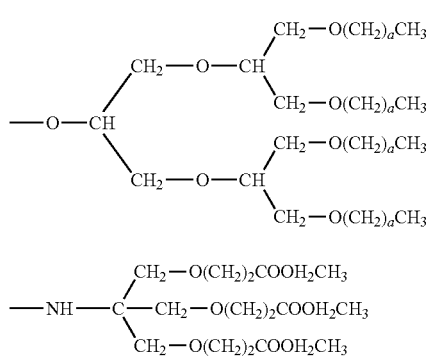

formula (5)

formula (6)

In formula (5), a is an integer from 1 to 11; preferably 1-7; In formula (4), $R_7$ is H; $R_8$ is selected from H, —SO$_3$H and salts thereof, —(CH$_2$)$_2$CH$_3$Cl, —CH$_2$N$^+$(CH$_3$)$_2$(CH$_2$)$_\xi$CH$_3$Cl$^-$ or —CH$_2$N$^+$(CH$_3$)$_2$(CH$_2$)$_2$N$^+$(CH$_3$)$_2$(CH$_2$)$_\sigma$CH$_3$2Cl$^-$; $\xi$ and $\sigma$ are respectively integers from 1 to 15, preferably 1-11.

Preferably, the highly sterically hindered structural unit B comprises a structure G and a structure of formula (4).

In another embodiment, the cyclic hydrocarbon structure formed on the basis of two adjacent carbon atoms in the main chain is selected from the group consisting of:

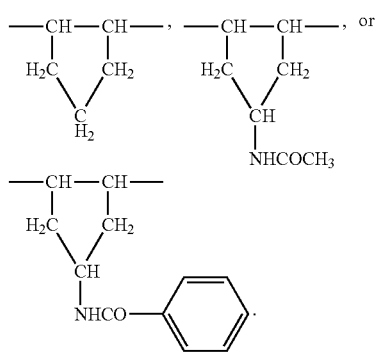

Preferably, the molar percentage of structure G of the highly sterically hindered structural unit B in the entire amphiphilic macromolecule repeating units is 0.02-2 mol %; preferably 0.02-1.0 mol %, more preferably 0.1-0.5 mol %.

Preferably, the molar percentage of the structure of formula (4) of the highly sterically hindered structural unit B in the entire amphiphilic macromolecule repeating units is 0.05-5 mol %; preferably 0.1-2.5 mol %, more preferably 0.1-1.5 mol %.

In another embodiment, the highly sterically hindered structural unit B has a structure of formula (7):

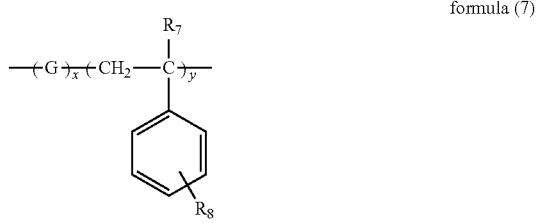

formula (7)

In formula (7), the definition on G is as described above, preferably the structure of formula (3),

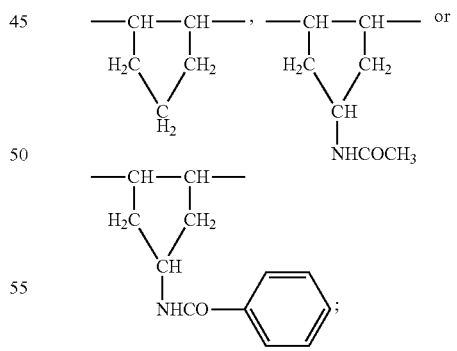

the definitions on $R_7$ and $R_8$ are as described in formula (4); x and y represent the molar percentages of the structure units in the entire amphiphilic macromolecule repeating units, and x is 0.02-2 mol %, preferably 0.02-1.0 mol %, more preferably 0.1-0.5 mol %; y is 0.05-5 mol %, preferably 0.1-2.5 mol %, and more preferably 0.1-1.5 mol %.

In another embodiment, the amphiphilic structural unit C has a structure of formula (8):

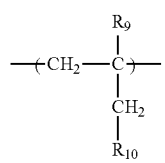

formula (8)

In formula (8), $R_9$ is H or a methyl group; $R_{10}$ is $-N^+(CH_3)_2(CH_2)_rCH_3X^-$, $-N^+((CH_2)_sCH_3)_3X^-$ or $-N^+(CH_3)((CH_2)_tCH_3)_2X^-$; r is an integer from 3 to 21; s is an integer from 2 to 9; t is an integer from 3 to 15; $X^-$ is $Cl^-$ or $Br^-$. Preferably, r is from 3 to 17, s is from 2 to 5, t is from 3 to 11.

Preferably, the molar percentage of amphiphilic structural unit C in the entire amphiphilic macromolecule repeating units is 0.05-10 mol %; preferably 0.1-5.0 mol %, more preferably 0.5-1.5 mol %.

In another embodiment, the amphiphilic macromolecule has a structure of formula (9):

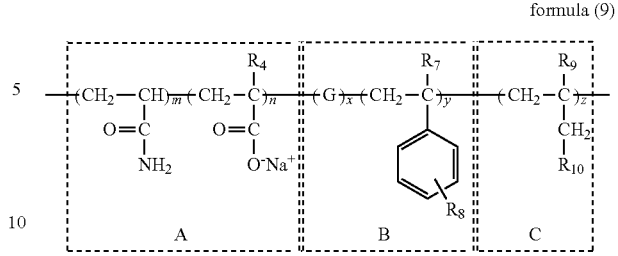

formula (9)

In formula (9), the definitions on $R_4$, m and n are as described in formula (2); the definitions on $R_7$, $R_8$, G, x and y are as described in formula (7); the definitions on $R_9$, and $R_{10}$ are as described in formula (8); z represents the molar percentage of this structural unit in the entire amphiphilic macromolecule repeat units, and z is 0.05-10 mol %, preferably 0.1-5.0 mol %, more preferably 0.5-1.5 mol %.

Specifically, this present invention provides a high molecular compound having a structure of formulas (I)-(X):

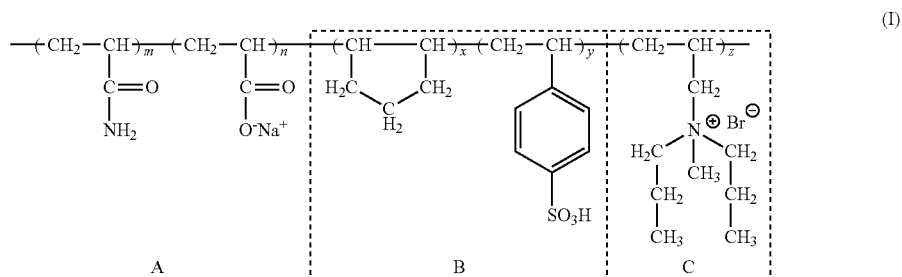

(I)

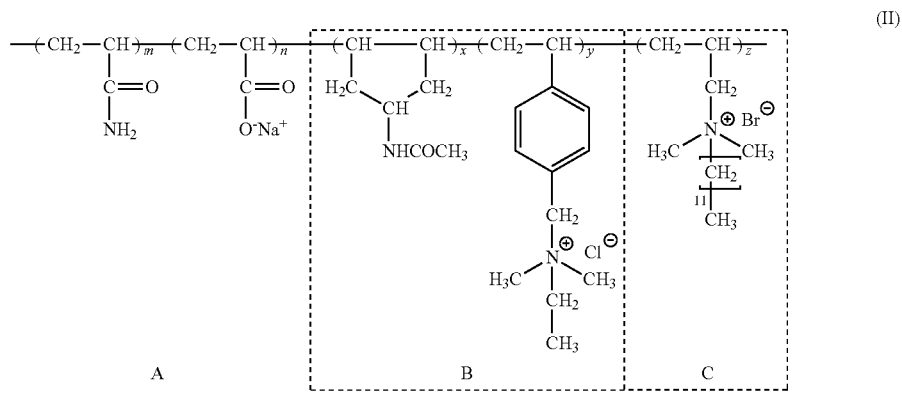

(II)

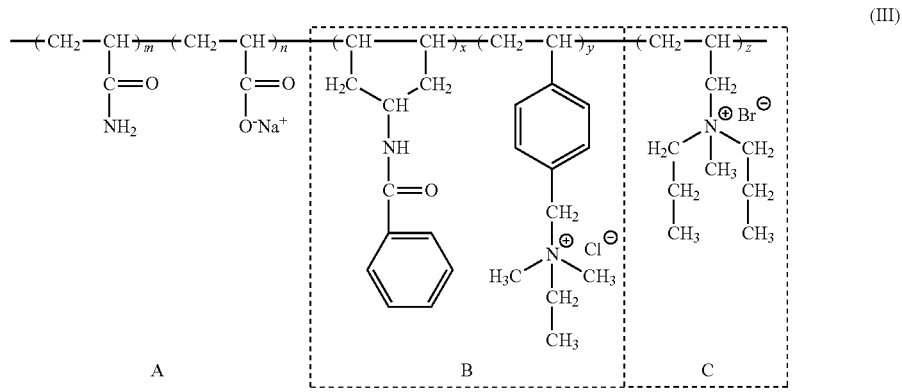

(III)

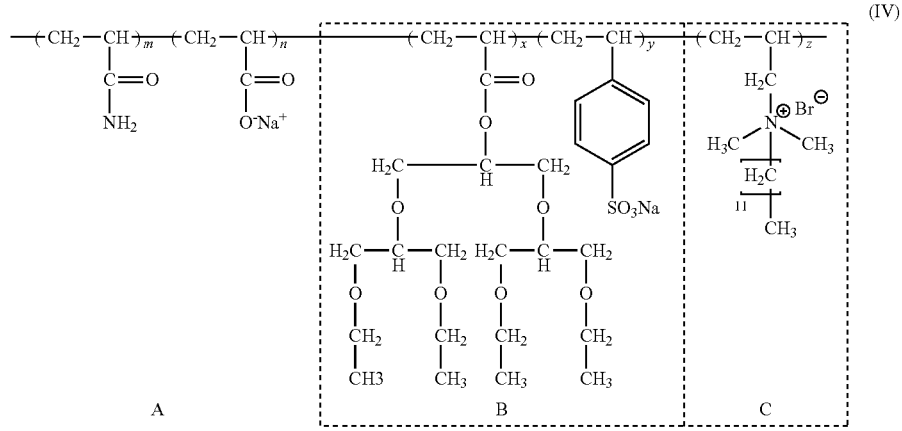
(IV)
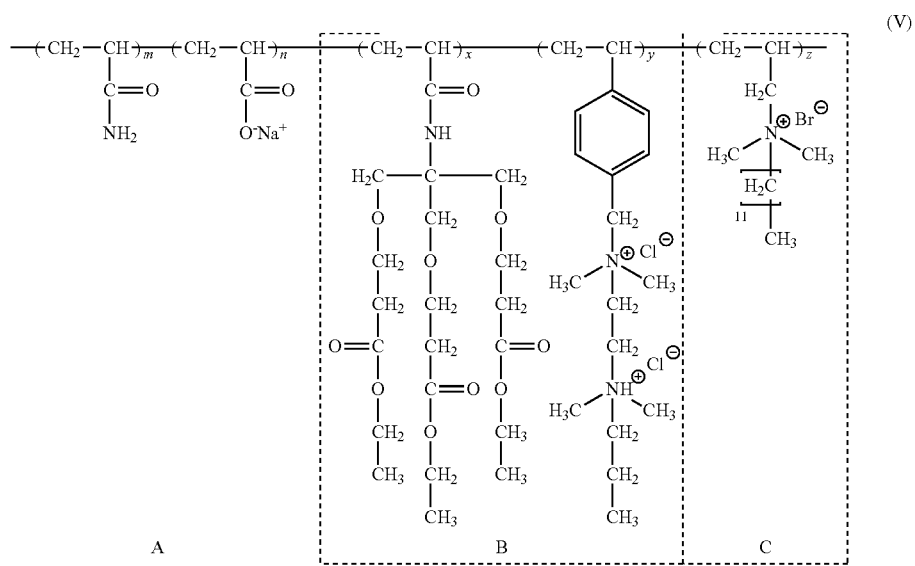
(V)
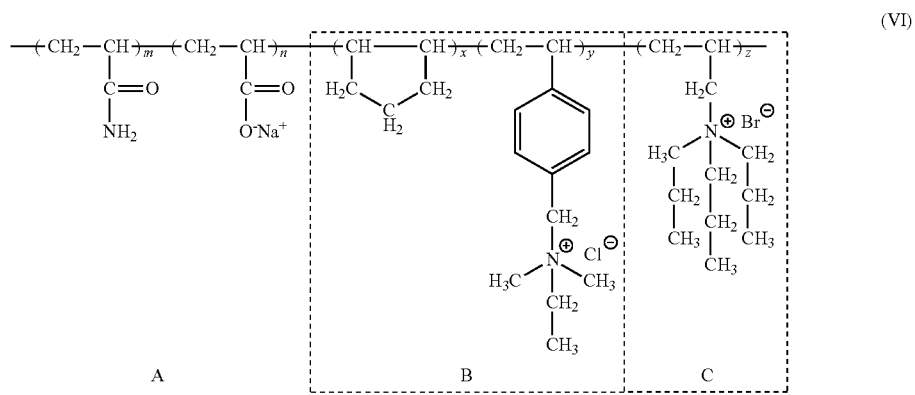
(VI)

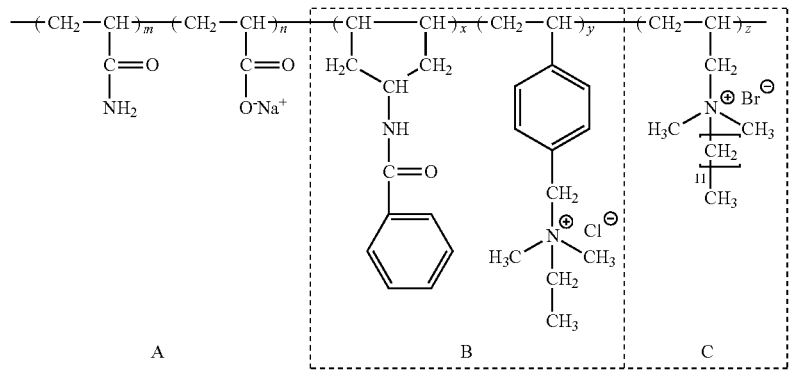
(VII)
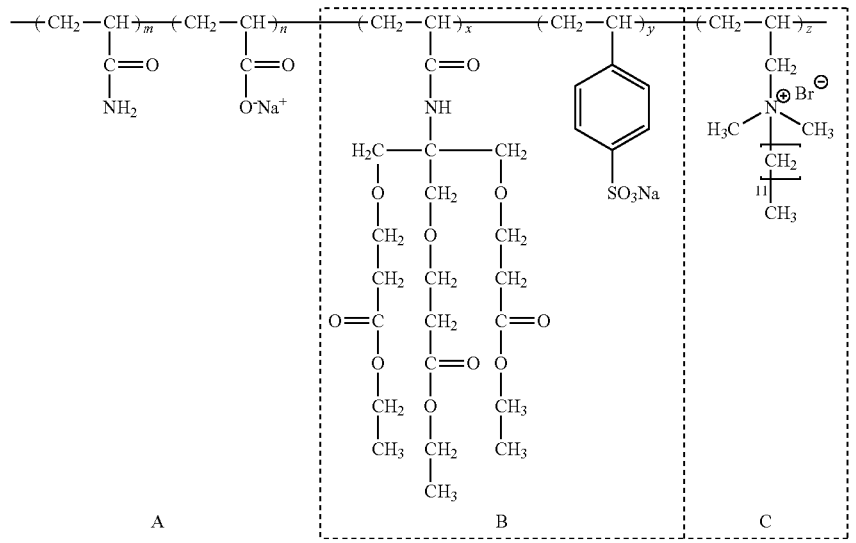
(VIII)
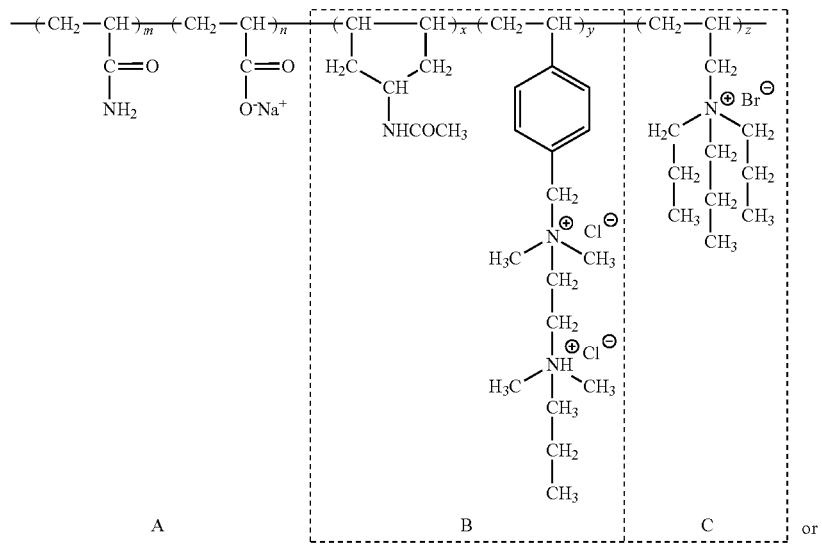
(IX)
or

-continued

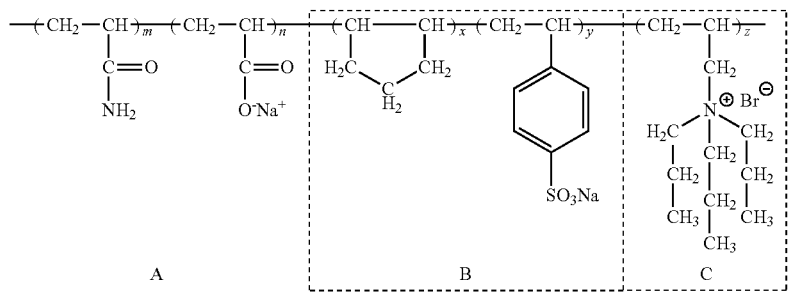

(X)

The molecular weight of the amphiphilic macromolecule described above is between 1000000 and 20000000; preferably between 3000000 and 13000000.

The measurement of the molecular weight M is as follows: The intrinsic viscosity [η] is measured by Ubbelohde viscometer as known in the art, then the obtained intrinsic viscosity [η] value is used in the following equation to obtain the desired molecular weight M:

$$M=802[\eta]^{1.25}$$

The amphiphilic macromolecule according to this present invention can be prepared by known methods in the art, for example, by polymerizing the structural unit for adjusting molecular weight, molecular weight distribution and charge characteristics, the highly sterically hindered structural unit and the amphiphilic structural unit in the presence of an initiator. The polymerization process can be any type well known in the art, such as, suspension polymerization, emulsion polymerization, solution polymerization, precipitation polymerization, etc.

A typical preparation method is as follows: the above monomers are each dispersed or dissolved in an aqueous system under stirring, the monomer mixture is polymerized by the aid of an initiator under nitrogen atmosphere to form the amphiphilic macromolecule. The so far existing relevant technologies for preparing an amphiphilic macromolecule can all be used to prepare the amphiphilic macromolecule of this invention.

All the monomers for preparing the amphiphilic macromolecule can be commercially available, or can be prepared on the basis of prior art technology directly, and some monomers' synthesis are described in details in specific examples.

DESCRIPTION OF FIGURES

FIG. 1 depicts the relationship of viscosity vs. concentration of the amphiphilic macromolecules obtained from examples 1-5 of the invention in saline having a degree of mineralization of $1 \times 10^4$ mg/L at a temperature of 60° C.

FIG. 2 depicts the relationship of viscosity vs. temperature of the amphiphilic macromolecules obtained from examples 1-5 of the invention in saline having a degree of mineralization of $1 \times 10^4$ mg/L at the concentration of 1750 mg/L.

DETAILED DESCRIPTION OF THE INVENTION

The present invention is further illustrated below by combining specific examples; however, this invention is not limited to the following examples.

Example 1

This example synthesized the amphiphilic macromolecule of formula (I):

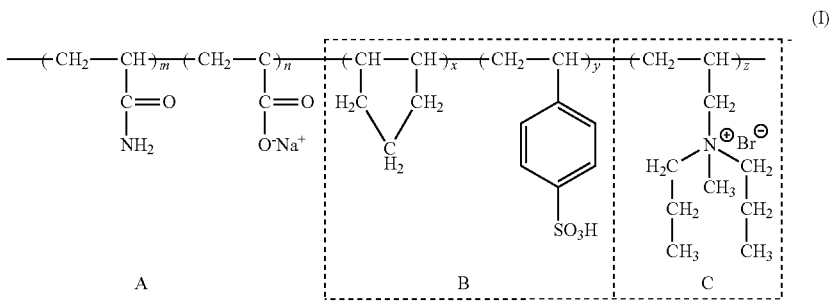

(I)

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 78%, 20%, 0.25%, 0.5%, 1.25% in succession. The mixture was stirred until complete dissolution, and a pH adjusting agent was then added in to adjust the reaction solution to have a pH value of about 8, then nitrogen gas was introduced in for 30 minutes to remove oxygen contained therein. An initiator was added into the reactor under the protection of nitrogen gas, and nitrogen gas was further continued for 10 minutes, then the reactor was sealed. The reaction was conducted at a temperature of 18° C.; after 5 hours, the reaction was ended with a complete conversion. After the drying of the obtained product, powdered amphiphilic macromolecule was obtained. The molecular weight of the amphiphilic macromolecule was $970 \times 10^4$.

Example 2

This example synthesized the amphiphilic macromolecule of formula (II):

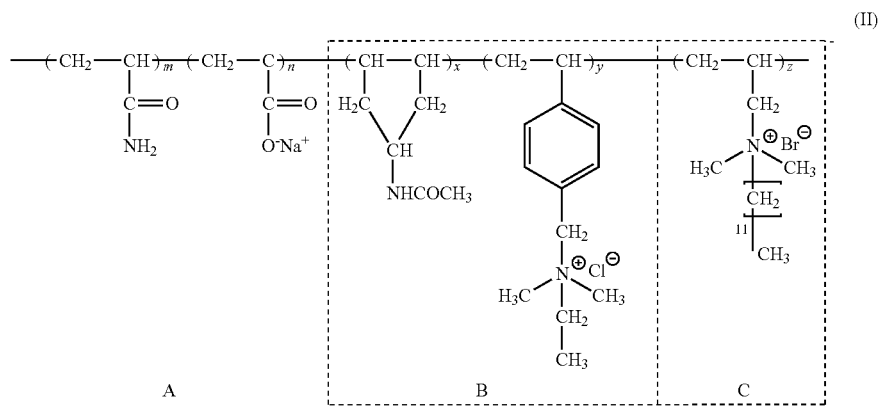
(II)

The synthesis route of the monomer

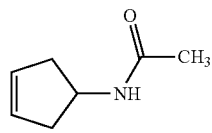

was as follows:

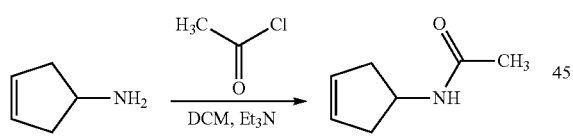

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 75%, 23%, 0.25%, 0.25%, 1.5% in succession. The mixture was stirred until complete dissolution, and a pH adjusting agent was then added in to adjust the reaction solution to have a pH value of about 8, then nitrogen gas was introduced in for 40 minutes to remove oxygen contained therein. An initiator was added into the reactor under the protection of nitrogen gas, and nitrogen gas was further continued for 10 minutes, then the reactor was sealed. The reaction was conducted at a temperature of 22° C.; after 5 hours, the reaction was ended with a complete conversion. After the drying of the obtained product, powdered amphiphilic macromolecule was obtained. The molecular weight of the amphiphilic macromolecule was $1030 \times 10^4$.

Example 3

This example synthesized the amphiphilic macromolecule of formula (III):

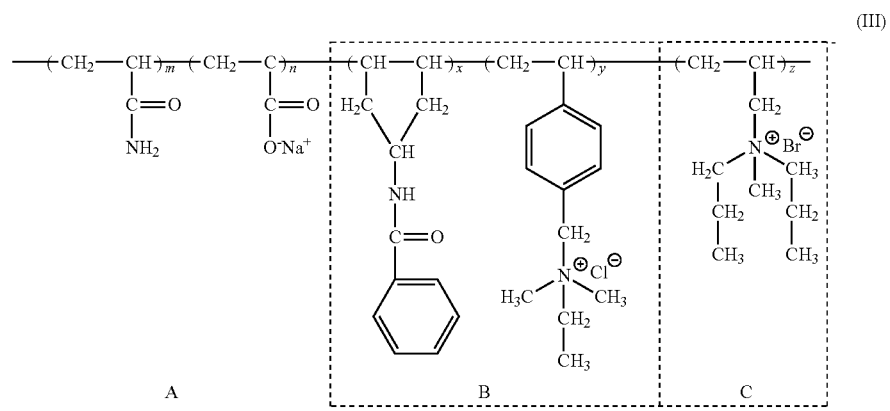
(III)

The synthesis route of the monomer

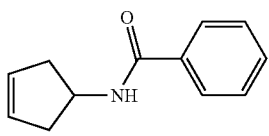 [SMILES: O=C(NC1CC=CC1)c1ccccc1]

was as follows:

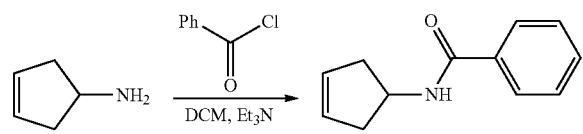 [SMILES: NC1CC=CC1 ; O=C(Cl)c1ccccc1 ; O=C(NC1CC=CC1)c1ccccc1]

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 73%, 26%, 0.1%, 0.1%, 0.8% in succession. The mixture was stirred until complete dissolution, and a pH adjusting agent was then added in to adjust the reaction solution to have a pH value of about 9, then nitrogen gas was introduced in for 30 minutes to remove oxygen contained therein. An initiator was added into the reactor under the protection of nitrogen gas, and nitrogen gas was further continued for 10 minutes, then the reactor was sealed. The reaction was conducted at a temperature of 25° C.; after 6 hours, the reaction was ended with a complete conversion. After the drying of the obtained product, powdered amphiphilic macromolecule was obtained. The molecular weight of the amphiphilic macromolecule was $620 \times 10^4$.

Example 4

This example synthesized the amphiphilic macromolecule of formula (IV):

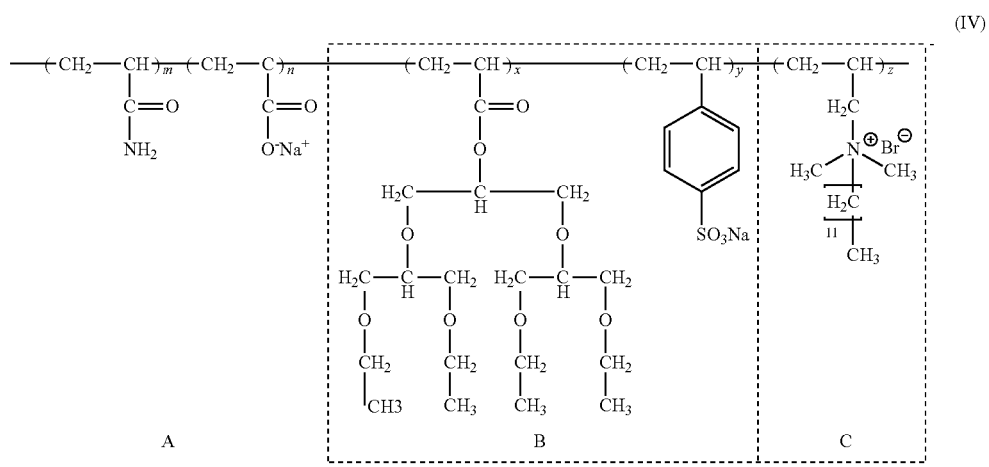

(IV)

The synthesis route of the monomer

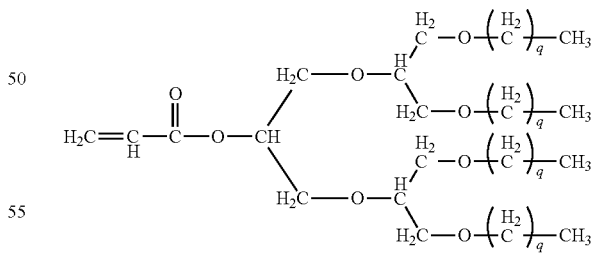

was as follows:

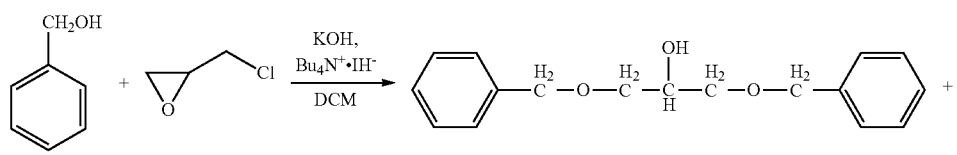

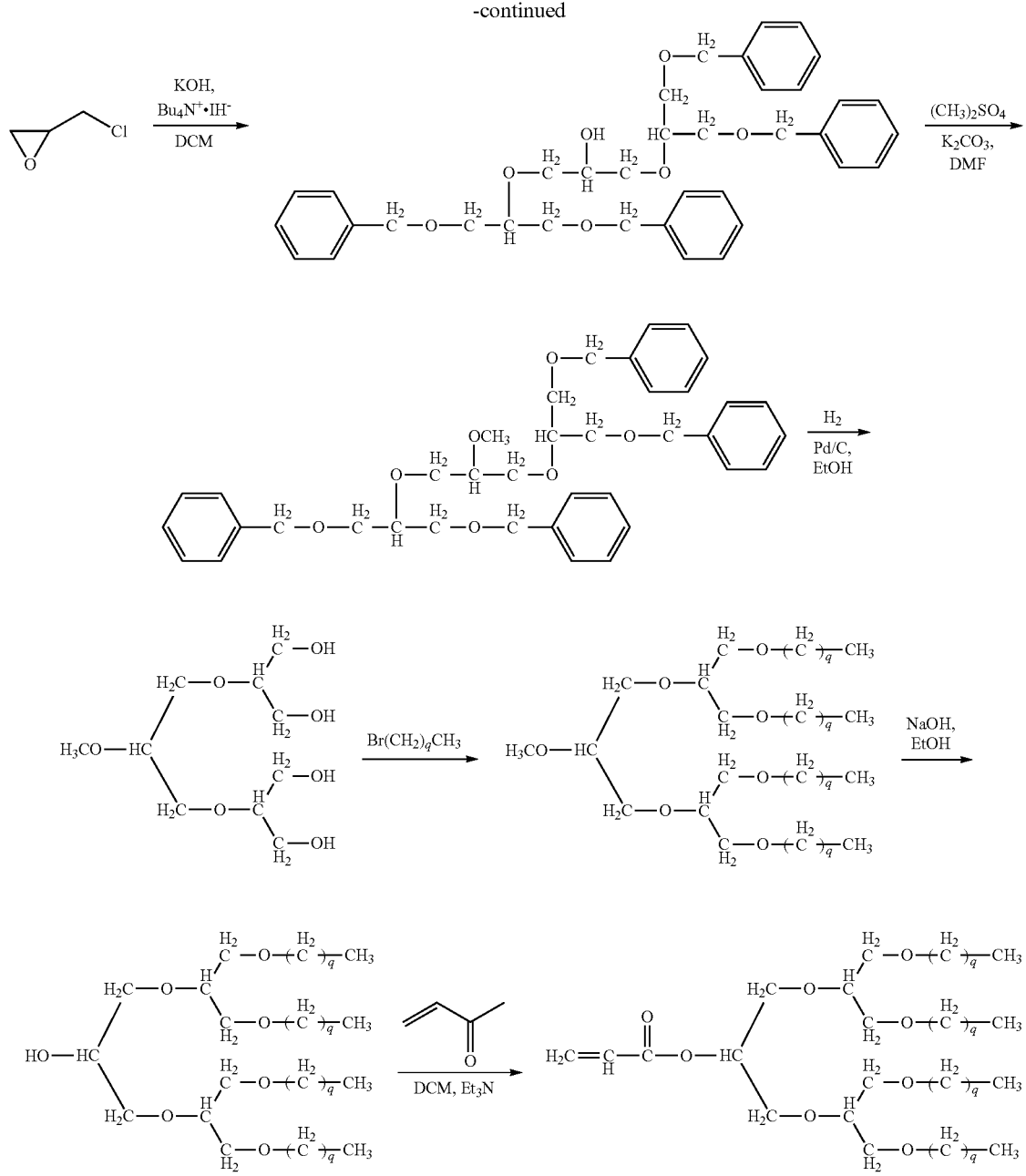

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 75%, 23%, 0.1%, 0.4%, 1.5% in succession. The mixture was stirred until complete dissolution, and a pH adjusting agent was then added in to adjust the reaction solution to have a pH value of about 9, then nitrogen gas was introduced in for 30 minutes to remove oxygen contained therein. An initiator was added into the reactor under the protection of nitrogen gas, and nitrogen gas was further continued for 10 minutes, then the reactor was sealed. The reaction was conducted at a temperature of 25° C.; after 6 hours, the reaction was ended with a complete conversion. After the drying of the obtained product, powdered amphiphilic macromolecule was obtained. The molecular weight of the amphiphilic macromolecule was $390 \times 10^4$.

Example 5

This example synthesized the amphiphilic macromolecule of formula (V):

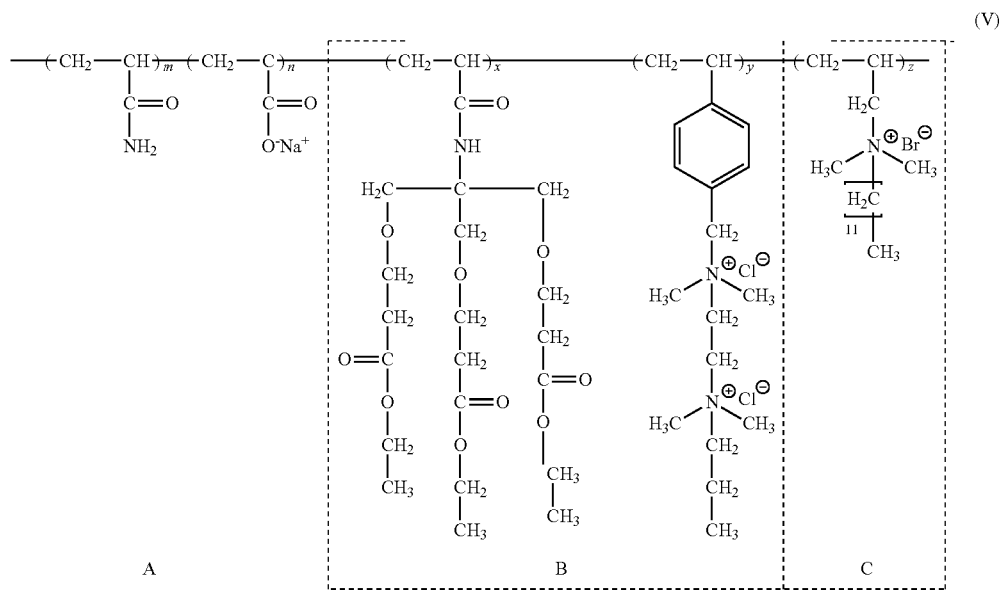

(V)

A           B           C

The synthesis route of the monomer was as follows:

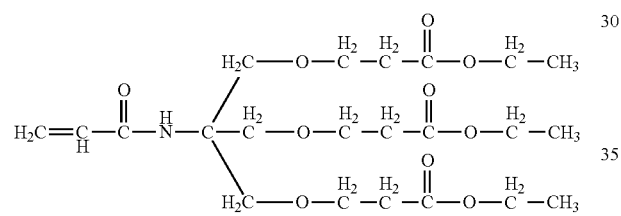

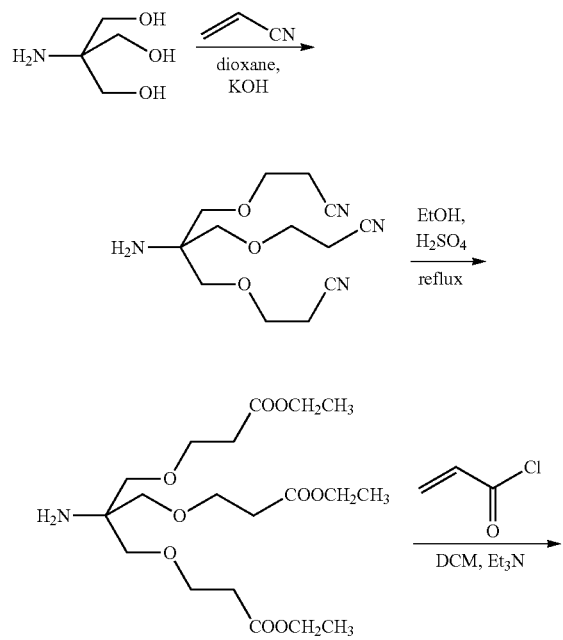

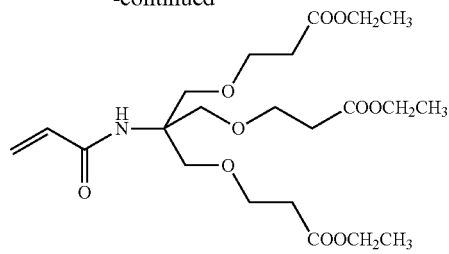

-continued

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 78%, 21%, 0.1%, 0.1%, 0.8% in succession. The mixture was stirred until complete dissolution, and a pH adjusting agent was then added in to adjust the reaction solution to have a pH value of about 8, then nitrogen gas was introduced in for 30 minutes to remove oxygen contained therein. An initiator was added into the reactor under the protection of nitrogen gas, and nitrogen gas was further continued for 10 minutes, then the reactor was sealed. The reaction was conducted at a temperature of 25° C.; after 6 hours, the reaction was ended with a complete conversion. After the drying of the obtained product, powdered amphiphilic macromolecule was obtained. The molecular weight of the amphiphilic macromolecule was $390 \times 10^4$.

Example 6

This example synthesized the amphiphilic macromolecule of formula (VI):

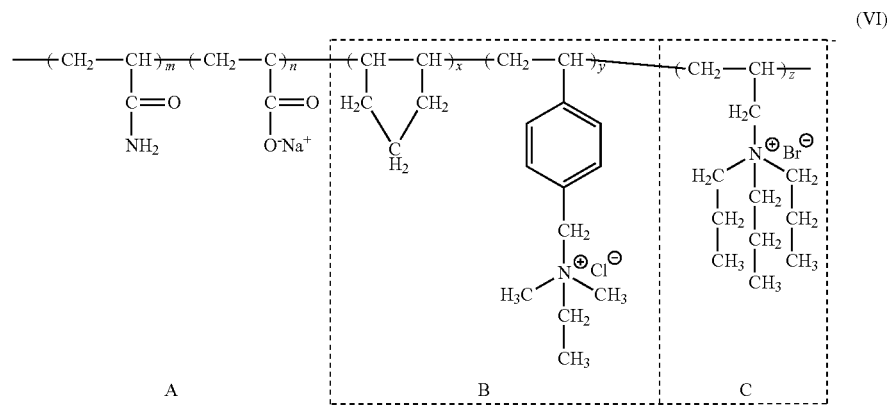

(VI)

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 73.5%, 25%, 0.5%, 0.5%, 0.5% in succession. The mixture was stirred until complete dissolution, and a pH adjusting agent was then added in to adjust the reaction solution to have a pH value of about 8, then nitrogen gas was introduced in for 30 minutes to remove oxygen contained therein. An initiator was added into the reactor under the protection of nitrogen gas, and nitrogen gas was further continued for 10 minutes, then the reactor was sealed. The reaction was conducted at a temperature of 45° C.; after 3 hours, the reaction was ended with a complete conversion. After the drying of the obtained product, powdered amphiphilic macromolecule was obtained. The molecular weight of the amphiphilic macromolecule was $680 \times 10^4$.

Example 7

This example synthesized the amphiphilic macromolecule of formula (VII):

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 75%, 23%, 0.25%, 0.25%, 1.5% in succession. The mixture was stirred until complete dissolution, and a pH adjusting agent was then added in to adjust the reaction solution to have a pH value of about 9, then nitrogen gas was introduced in for 30 minutes to remove oxygen contained therein. An initiator was added into the reactor under the protection of nitrogen gas, and nitrogen gas was further continued for 10 minutes, then the reactor was sealed. The reaction was conducted at a temperature of 55° C.; after 3 hours, the reaction was ended with a complete conversion. After the drying of the obtained product, powdered amphiphilic macromolecule was obtained. The molecular weight of the amphiphilic macromolecule was $690 \times 10^4$.

Example 8

This example synthesized the amphiphilic macromolecule of formula (VIII):

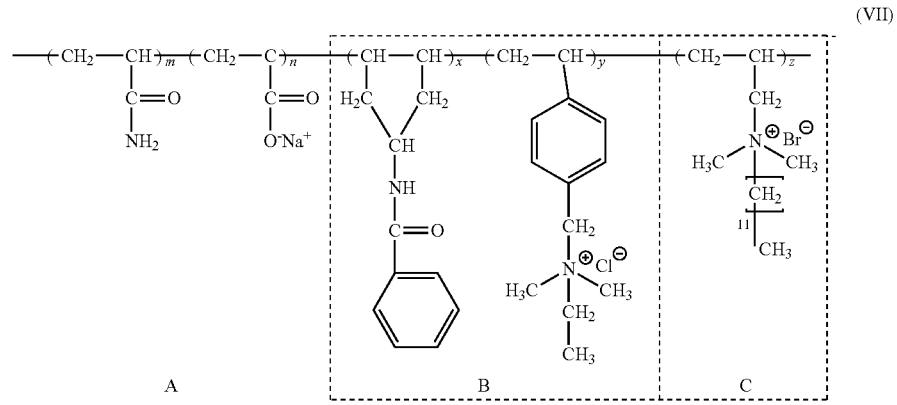

(VII)

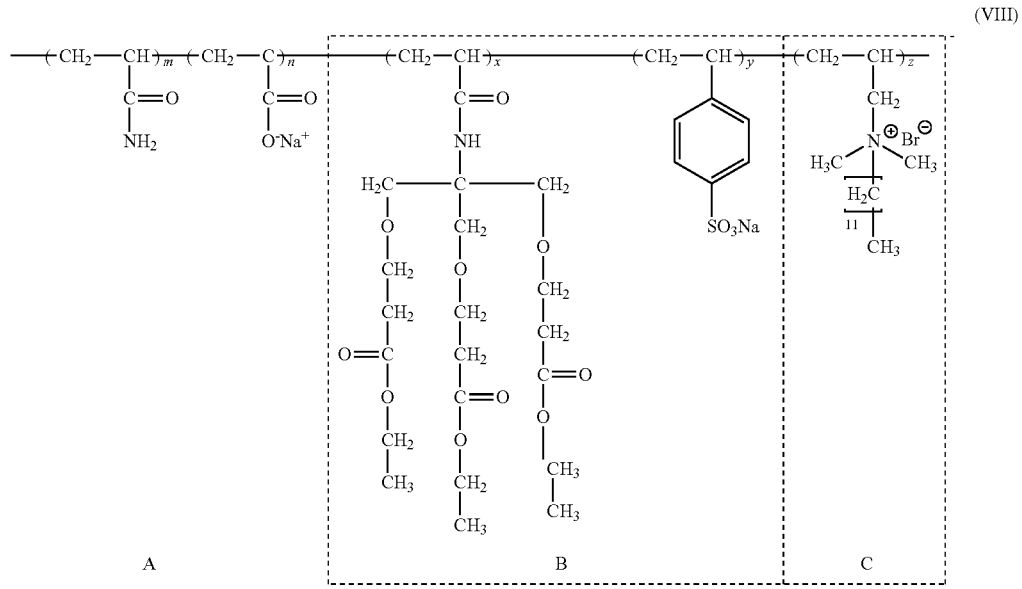

(VIII)

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 70%, 28%, 0.15%, 0.75%, 1.1% in succession. The mixture was stirred until complete dissolution, and a pH adjusting agent was then added in to adjust the reaction solution to have a pH value of about 8, then nitrogen gas was introduced in for 30 minutes to remove oxygen contained therein. An initiator was added into the reactor under the protection of nitrogen gas, and nitrogen gas was further continued for 10 minutes, then the reactor was sealed. The reaction was conducted at a temperature of 55° C.; after 3 hours, the reaction was ended with a complete conversion. After the drying of the obtained product, powdered amphiphilic macromolecule was obtained. The molecular weight of the amphiphilic macromolecule was $390 \times 10^4$.

Example 9

This example synthesized the amphiphilic macromolecule of formula (IX):

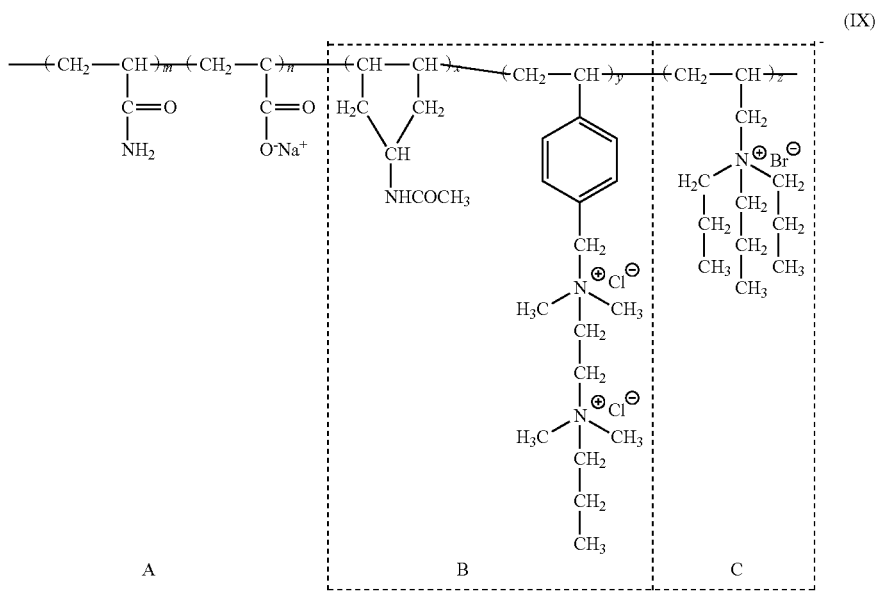

(IX)

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 75%, 23.5%, 0.5%, 0.5%, 0.5% in succession. The mixture was stirred until complete dissolution, and a pH adjusting agent was then added in to adjust the reaction solution to have a pH value of about 8, then nitrogen gas was introduced in for 30 minutes to remove oxygen contained therein. An initiator was added into the reactor under the protection of nitrogen gas, and nitrogen gas was further continued for 10 minutes, then the reactor was sealed. The reaction was conducted at a temperature of 50° C.; after 2.5 hours, the reaction was ended with a complete conversion. After the drying of the obtained product, powdered amphiphilic macromolecule was obtained. The molecular weight of the amphiphilic macromolecule was $430 \times 10^4$.

Example 10

This example synthesized the amphiphilic macromolecule of formula (X):

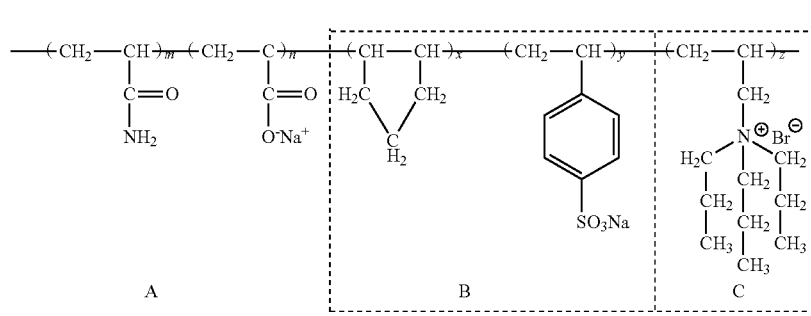

The synthesis of the amphiphilic macromolecule of this example was as follows:

Firstly, water, accounting for ¾ of the total weight of the reaction system, was charged into a reactor, then various monomers, totally accounting for ¼ of the total weight of the reaction system, were charged into the reactor as well, and the molar percentages m, n, x, y, z for each repeating units were 74%, 23%, 0.5%, 1.5%, 1% in succession. The mixture was stirred until complete dissolution, and a pH adjusting agent was then added in to adjust the reaction solution to have a pH value of about 8, then nitrogen gas was introduced in for 30 minutes to remove oxygen contained therein. An initiator was added into the reactor under the protection of nitrogen gas, and nitrogen gas was further continued for 10 minutes, then the reactor was sealed. The reaction was conducted at a temperature of 50° C.; after 2 hours, the reaction was ended with a complete conversion. After the drying of the obtained product, powdered amphiphilic macromolecule was obtained. The molecular weight of the amphiphilic macromolecule was $560 \times 10^4$.

MEASUREMENT EXAMPLES

Measurement Example 1

Saline having a mineralization degree of $1 \times 10^4$ mg/L was used to prepare amphiphilic macromolecule solutions with different concentrations, and the relationship between the concentration, temperature and the viscosity of the solution was determined. The results were shown in FIG. 1 and FIG. 2.

The figures showed that the amphiphilic macromolecule solutions of examples 1-5 still have favorable viscosifying capacity under the condition of high temperature and high degree of mineralization. The highly sterically hindered unit in the amphiphilic macromolecule reduced the rotational degree of freedom in the main chain and increased the rigidity of the macromolecule chain, which made the macromolecule chain difficult to curl and tend to stretch out, thus enlarging the hydrodynamic radius of the macromolecule; in the meantime, the amphiphilic structural unit associated each other to form the microdomain by intramolecular- or intermolecular-interaction, thus enhancing the viscosifying capacity of the solution remarkably under the conditions of high temperature and high salinity.

Measurement Example 2

Testing method: Under a testing temperature of 25° C., 25 ml electric dehydration crude oil samples from three types of oilfields were added in a 50 ml test tube with a plug, then 25 ml aqueous solutions of amphiphilic macromolecule with different concentrations formulated with distilled water were added in. The plug of the test tube was tightened, then the test tube was shaken manually or by using an oscillating box for 80-100 times in horizontal direction, and the shaking amplitude should be greater than 20 cm. After sufficient mixing, the plug of the test tube was loosed. Viscosity reduction rate for crude oil was calculated according to the following equation:

$$\text{Viscosity reduction rate}(\%) = \frac{\text{viscosity of crude oil sample} - \text{viscosity after mixing}}{\text{viscosity of crude oil sample}} \times 100$$

Table 1 Experimental results of the heavy oil viscosity reduction of the amphiphilic macromolecule obtained from the example 6-example 10. (oil-water ratio 1:1, 25° C.)

| oil-water volume ratio (1:1) test temperature (25° C.) initial viscosity (mPa·s) | | oil sample 1 1800 | viscosity reduction rate (%) — | oil sample 2 6700 | viscosity reduction rate (%) — | oil sample 3 18000 | viscosity reduction rate (%) — |
|---|---|---|---|---|---|---|---|
| Example 6 | 400 mg/L | 850 | 52.78 | 2300 | 65.67 | 4700 | 73.89 |
| | 600 mg/L | 550 | 69.44 | 1475 | 77.99 | 2350 | 86.94 |
| | 800 mg/L | 340 | 81.11 | 975 | 85.45 | 1250 | 93.06 |
| | 1000 mg/L | 280 | 84.44 | 750 | 88.81 | 950 | 94.72 |
| | 1200 mg/L | 220 | 87.78 | 650 | 90.30 | 825 | 95.42 |
| Example 7 | 400 mg/L | 910 | 49.44 | 2400 | 64.18 | 4450 | 75.28 |
| | 600 mg/L | 590 | 67.22 | 1600 | 76.12 | 2100 | 88.33 |
| | 800 mg/L | 450 | 75.00 | 1175 | 82.46 | 1050 | 94.17 |
| | 1000 mg/L | 340 | 81.11 | 830 | 87.61 | 890 | 95.06 |
| | 1200 mg/L | 260 | 85.56 | 680 | 89.85 | 780 | 95.67 |
| Example 8 | 400 mg/L | 820 | 54.44 | 2050 | 69.40 | 4250 | 76.39 |
| | 600 mg/L | 470 | 73.89 | 1370 | 79.55 | 1975 | 89.03 |
| | 800 mg/L | 315 | 82.50 | 850 | 87.31 | 1325 | 92.64 |
| | 1000 mg/L | 230 | 87.22 | 675 | 89.93 | 930 | 94.83 |
| | 1200 mg/L | 200 | 88.89 | 590 | 91.19 | 850 | 95.28 |
| Example 9 | 400 mg/L | 925 | 48.61 | 2270 | 66.12 | 4700 | 73.89 |
| | 600 mg/L | 630 | 65.00 | 1420 | 78.81 | 2550 | 85.83 |
| | 800 mg/L | 450 | 75.00 | 940 | 85.97 | 1480 | 91.78 |
| | 1000 mg/L | 380 | 78.89 | 680 | 89.85 | 1050 | 94.17 |
| | 1200 mg/L | 340 | 81.11 | 530 | 92.09 | 880 | 95.11 |
| Example 10 | 400 mg/L | 820 | 54.44 | 1900 | 71.64 | 5100 | 71.67 |
| | 600 mg/L | 530 | 70.56 | 1250 | 81.34 | 2900 | 83.89 |
| | 800 mg/L | 390 | 78.33 | 825 | 87.69 | 1890 | 89.50 |
| | 1000 mg/L | 305 | 83.06 | 650 | 90.30 | 1400 | 92.22 |
| | 1200 mg/L | 260 | 85.56 | 575 | 91.42 | 1175 | 93.47 |

Table 1 showed that the amphiphilic macromolecules of examples 6-10 had good effects for viscosity reduction as to all three oil samples. With the increase of the concentration of the amphiphilic macromolecule solution, the viscosity reduction rate increased. And, when the concentration of the amphiphilic macromolecule solution was the same, the viscosity reduction rate increased with the enhancing of the viscosity of the oil sample. It was believed that the amphiphilic macromolecule could reduce the viscosity of the crude oil remarkably via a synergetic effect between the highly sterically hindered structural unit and the amphiphilic structural unit, which could emulsify and disperse the crude oil effectively.

INDUSTRIAL APPLICATION

The amphiphilic macromolecule of this invention can be used in oilfield drilling, well cementing, fracturing, crude oil gathering and transporting, sewage treating, sludge treating and papermaking, and it can be used as intensified oil producing agent and oil displacing agent, heavy oil viscosity reducer, fracturing fluid, clay stabilizer, sewage treating agent, retention aid and drainage aid and strengthening agent for papermaking.

The amphiphilic macromolecule of this invention is especially suitable for crude oil exploitation, for instance, it can be used as an intensified oil displacement polymer and a viscosity reducer for heavy oil. When it is used as an oil displacement agent, it has remarkable viscosifying effect even under the condition of high temperature and high salinity, and can thus enhance the crude oil recovery. When it is used as a viscosity reducer for heavy oil, it can remarkably reduce the viscosity of the heavy oil and decrease the flow resistance thereof in the formation and wellbore by emulsifying and dispersing the heavy oil effectively.

What is claimed is:

1. An amphiphilic macromolecule comprising: as repeating units, a structural unit A for adjusting molecular weight, molecular weight distribution and charge characteristics, a highly sterically hindered structural unit B and an amphiphilic structural unit C, the highly sterically hindered structural unit B comprises a structure G and a structure of formula (4), wherein the structure G is a cyclic hydrocarbon structure formed on the basis of two adjacent carbon atoms in the main chain, or is selected from a structure of formula (3):

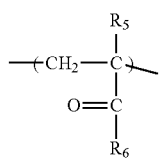

formula (3)

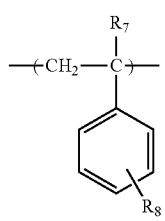

formula (4)

wherein in formula (3), $R_5$ is H or a methyl group; $R_6$ is a radical selected from the group consisting of the structures of formula (5) and formula (6):

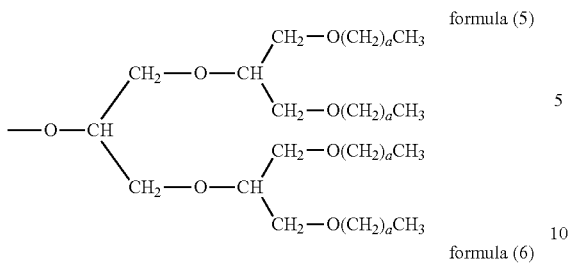

formula (5)

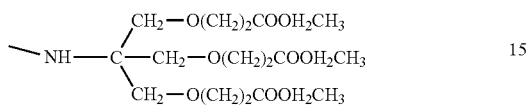

formula (6)

in formula (5), a is an integer from 1 to 11;
in formula (4), $R_7$ is H; $R_8$ is selected from the group consisting of H, —SO$_3$H and salts thereof, —(CH$_2$)$_2$CH$_3$Cl, —CH$_2$N$^+$(CH$_3$)$_2$(CH$_2$)$_\xi$CH$_3$Cl$^-$, and —CH$_2$N$^+$(CH$_3$)$_2$(CH$_2$)$_2$ N$^+$(CH$_3$)$_2$(CH$_2$)$_\sigma$CH$_3$2Cl$^-$; ξ and σ are respectively integers from 1 to 15; and
the amphiphilic structural unit C has a structure of formula (8):

formula (8)

in formula (8), $R_9$ is H or a methyl group; $R_{10}$ is —N$^+$(CH$_3$)$_2$(CH$_2$)$_r$CH$_3$X$^-$, —N$^+$((CH$_2$)sCH$_3$)$_3$X$^-$ or —N$^+$(CH$_3$)((CH$_2$)$_t$CH$_3$)$_2$X$^-$; r is an integer from 3 to 21; s is an integer from 2 to 9; t is an integer from 3 to 15; and X$^-$ is Cl$^-$ or Br$^-$.

2. The amphiphilic macromolecule as claimed in claim 1, wherein the structural unit A for adjusting the molecular weight, molecular weight distribution and charge characteristics comprises a (meth)acrylamide monomer unit $A_1$ and/or a (meth)acrylic monomer unit $A_2$.

3. The amphiphilic macromolecule as claimed in claim 2, wherein based on 100 mol % of the entire amphiphilic macromolecule repeating units, the molar percentage of the (meth)acrylamide monomer unit $A_1$ is 70-99 mol %; and the molar percentage of the (meth)acrylic monomer unit $A_2$ is 1-30 mol %.

4. The amphiphilic macromolecule as claimed in claim 1, wherein based on 100 mol % of the entire amphiphilic macromolecule repeating units, the molar percentage of the structure G is 0.02-2 mol %; and the molar percentage of the structure of formula (4) is 0.05-5 mol %.

5. The amphiphilic macromolecule as claimed in claim 1, wherein based on 100 mol % of the entire amphiphilic macromolecule repeating units, the molar percentage of the structure of formula (8) is 0.05-10 mol %.

6. The amphiphilic macromolecule as claimed in claim 1, wherein the structural unit A for adjusting molecular weight, molecular weight distribution and charge characteristics has a structure of formula (2):

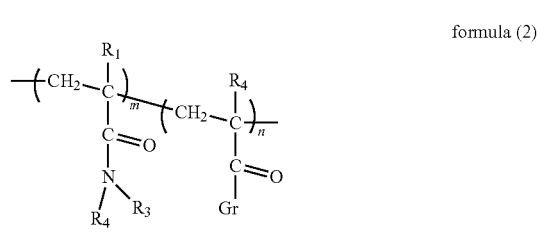

formula (2)

wherein in formula (2), $R_1$ is H or a methyl group; $R_2$ and $R_3$ are independently selected from the group consisting of H and a $C_1$-$C_3$ alkyl group; $R_4$ is selected from the group consisting of H and a methyl group; Gr is —OH or —O$^-$Na$^+$; m and n represent the molar percentages of the structural units in the entire amphiphilic macromolecule, and m is from 70 to 99 mol %; n is from 1 to 30 mol %.

7. The amphiphilic macromolecule as claimed in claim 1, wherein the cyclic hydrocarbon structure formed on the basis of the two adjacent carbon atoms in the main chain is selected from the group consisting of:

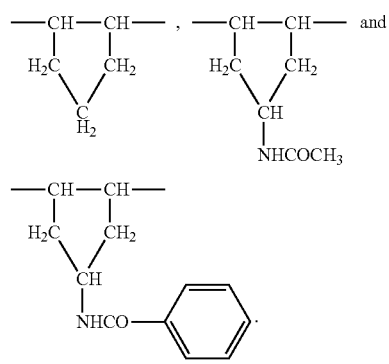

8. The amphiphilic macromolecule as claimed in claim 1, wherein the highly sterically hindered structural unit B has a structure of formula (7):

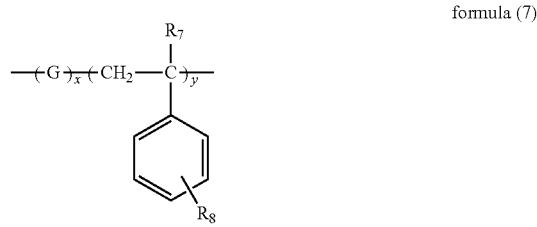

formula (7)

wherein in formula (7), the definition on G is as described in claim 1; the definitions of $R_7$ and $R_8$ are as described in formula (4); x and y respectively represent the molar percentages of the structural units in the entire amphiphilic macromolecule, and x is from 0.02 to 2 mol %, y is from 0.05 to 5 mol %.

9. The amphiphilic macromolecule as claimed in claim 8, wherein the amphiphilic macromolecule has a structure of formula (9):

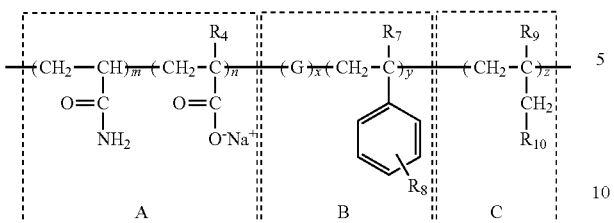

formula (9)

wherein in formula (9), $R_4$ is selected from the group consisting of H and a methyl group; m and n represent the molar percentages of the structural units in the entire amphiphilic macromolecule, and m is from 70 to 99 mol %; n is from 1 to 30 mol %; the definitions of G, $R_7$, $R_8$, x and y are as described in formula (7); the definitions of $R_9$ and $R_{10}$ are as described in formula (8); z represents the molar percentage of this structural unit in the entire amphiphilic macromolecule, and z is from 0.05 to 10 mol %.

10. The amphiphilic macromolecule as claimed in claim 1, which is a compound of formulas (I)-(X):

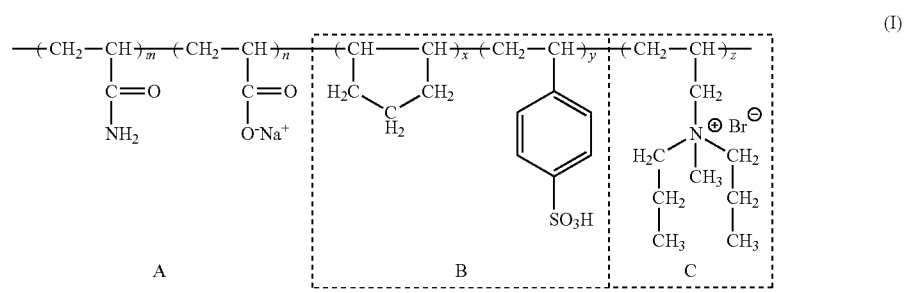

(I)

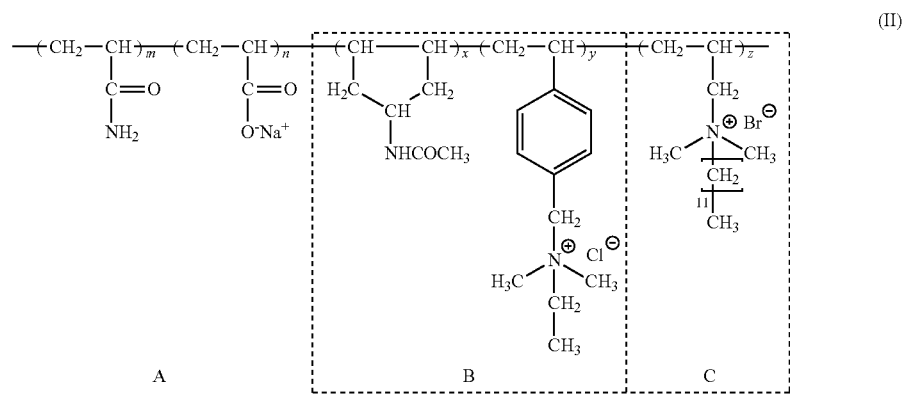

(II)

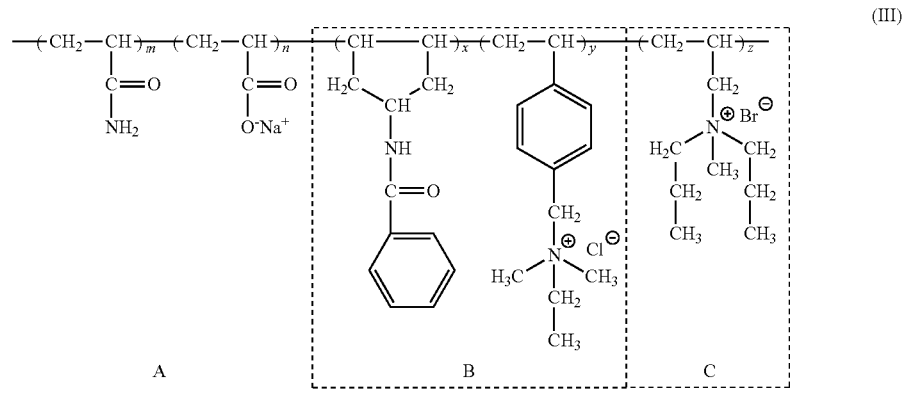

(III)

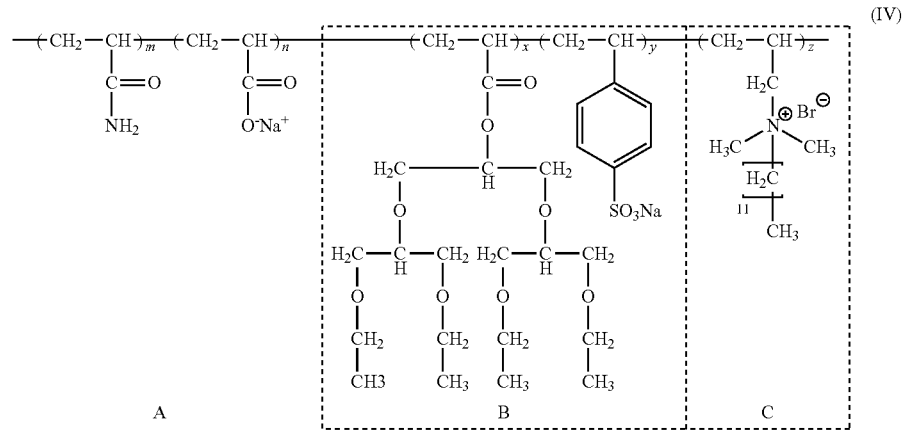
(IV)
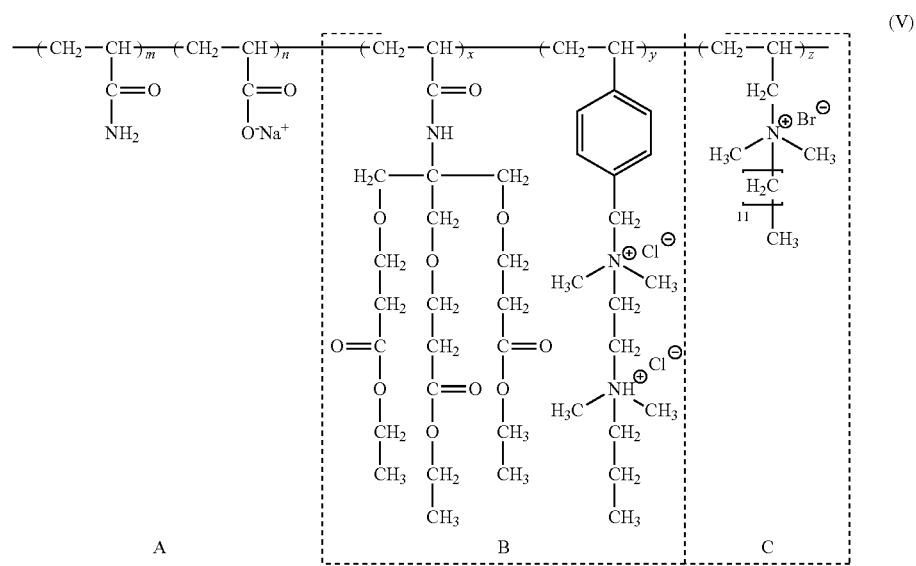
(V)
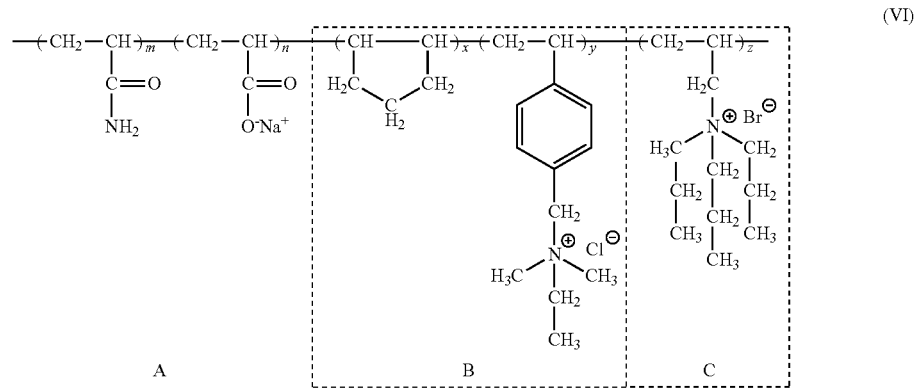
(VI)

-continued
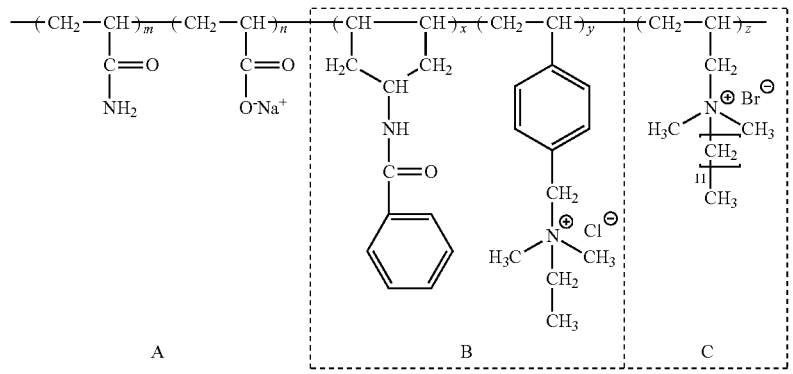
(VII)
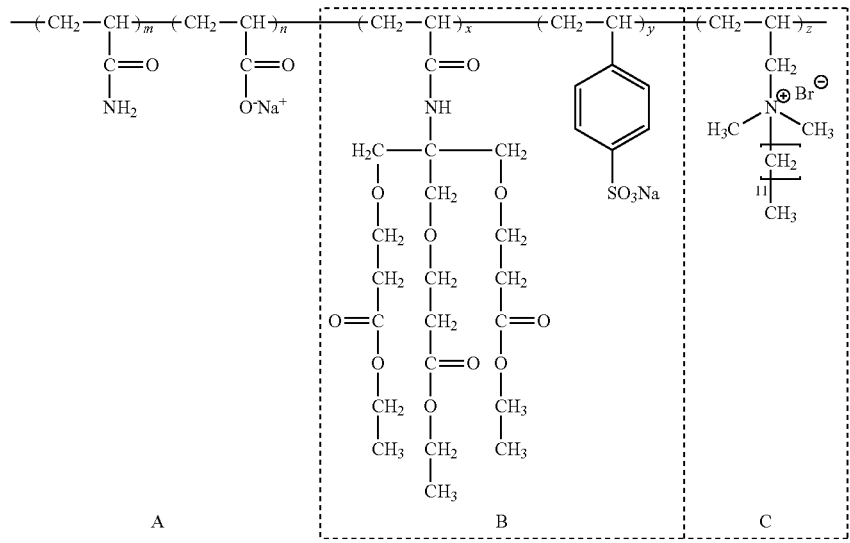
(VIII)
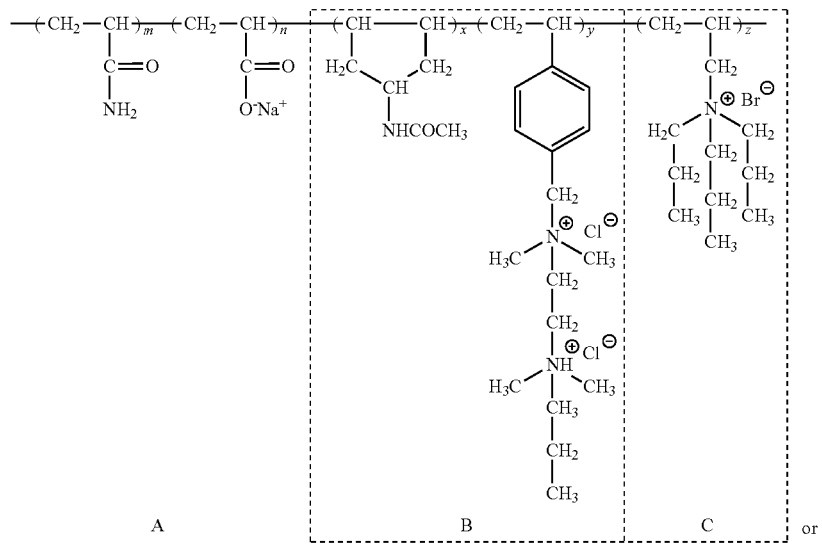
(IX)
or

-continued

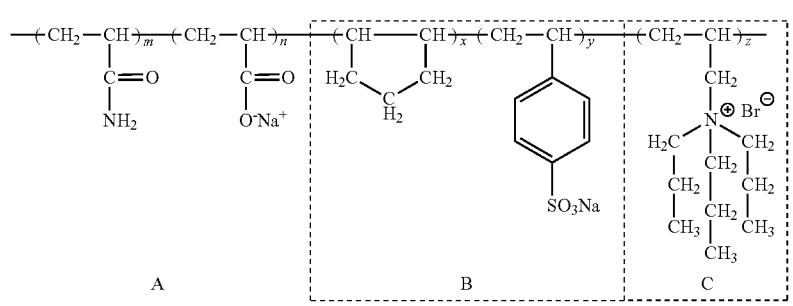

(X)

11. The amphiphilic macromolecule as claimed in claim 1, wherein the amphiphilic macromolecule has a viscosity average molecular weight of between 1000000-20000000.

12. The amphiphilic macromolecule as claimed in claim 1 for use in at least one of oilfield drilling, well cementing, fracturing, crude oil gathering and transporting, sewage treating, sludge treating and papermaking as an intensified oil producing agent, oil displacing agent, heavy oil viscosity reducer, fracturing fluid, clay stabilizer, sewage treating agent, retention aid and drainage aid and strengthening agent for papermaking.

13. The amphiphilic macromolecule as claimed in claim 1, wherein $R_5$ is H.

* * * * *